April 28, 1925.
H. J. McQUILLAN
1,535,535
HEADER AND THRASHER HARVESTER
Filed March 22, 1921  2 Sheets-Sheet 1
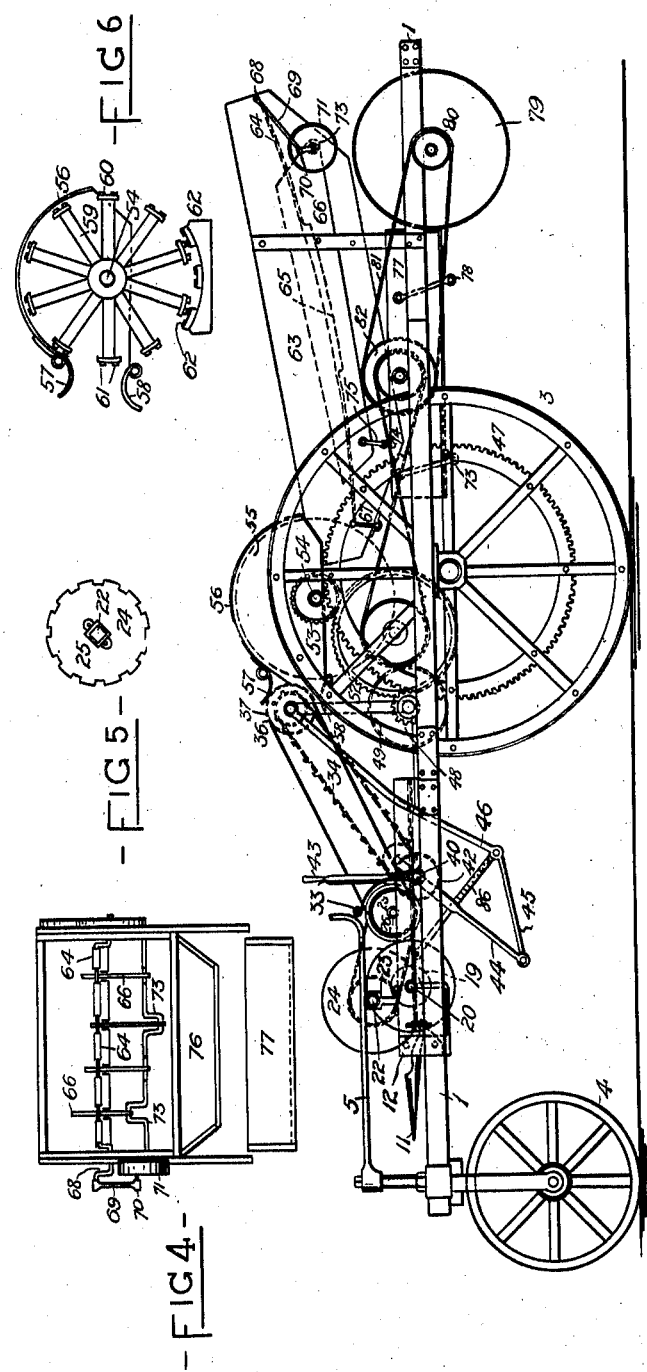
INVENTOR
Harry Joseph McQuillan
By Otto Munk
his ATTORNEY.

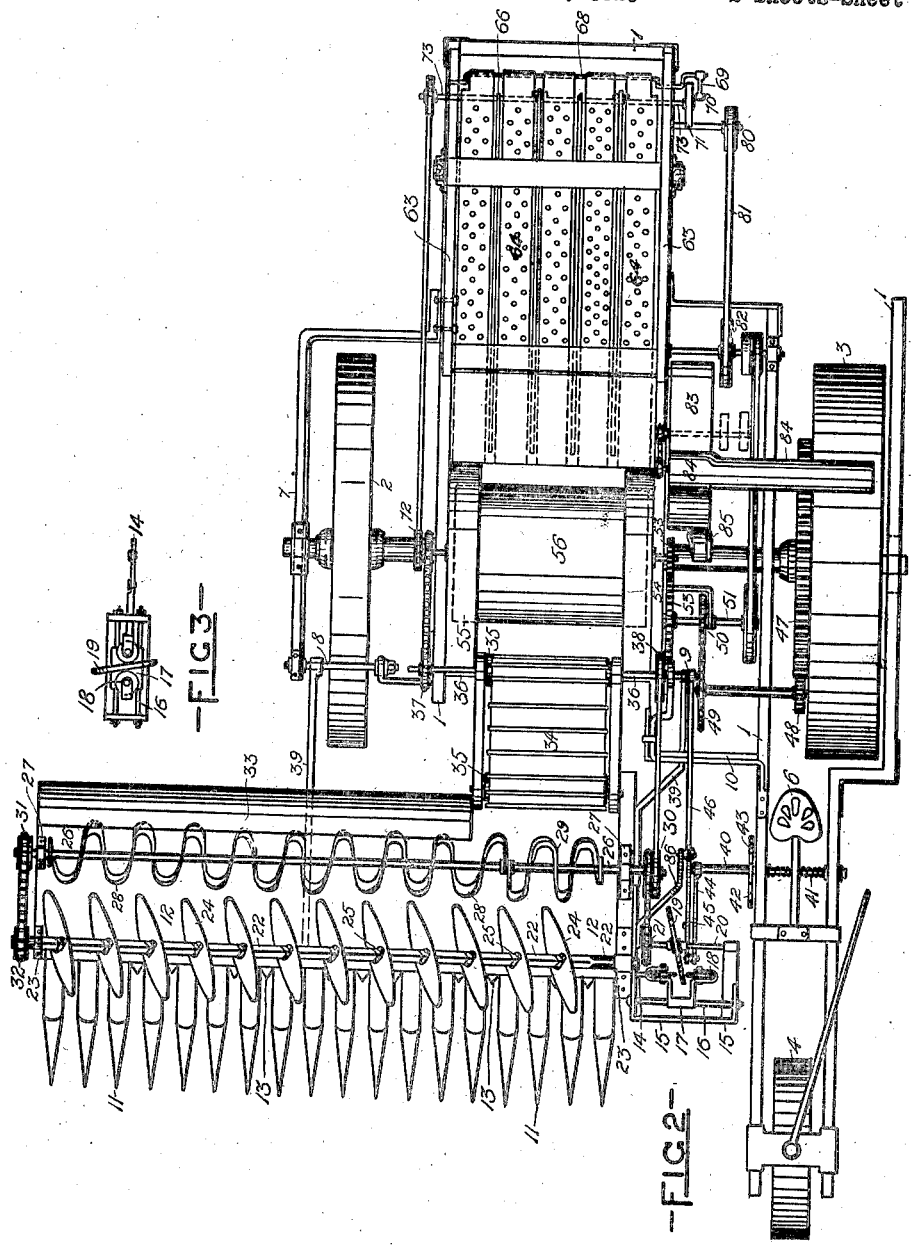

Patented Apr. 28, 1925.

1,535,535

UNITED STATES PATENT OFFICE.

HARRY JOSEPH McQUILLAN, OF FARRELL'S FLAT, SOUTH AUSTRALIA, AUSTRALIA.

HEADER AND THRASHER HARVESTER.

Application filed March 22, 1921. Serial No. 454,411.

*To all whom it may concern:*

Be it known that HARRY JOSEPH McQUILLAN, a subject of His Majesty the King of Great Britain and citizen of the Commonwealth of Australia, residing at Farrell's Flat, in the State of South Australia, in the Commonwealth of Australia aforesaid, hath invented certain new and useful Improvements in Header and Thrasher Harvesters, of which the following is a specification.

My invention relates to an improved header and thrasher harvester, the object of the same being to provide simple and effective mechanism for operating the working parts, and to avoid using bevel gear wheels in the driving mechanism.

In carrying my invention into effect I provide an underframe which is mounted upon traction wheels and is fitted with steering apparatus, but these parts do not differ in any great extent from those already well-known and in use, but the front portion of the machine which carries the comb bar and associated parts can be easily detached from the frame, thus rendering the machine convenient for transport and housing purposes.

In the front part of the machine I provide a comb beneath which a knife bar is arranged. This knife bar is reciprocated by novel means and the comb is also cleared by specially designed mechanism. The head and straw is carried along a platform or apron by means of an Archimedean screw and falls into a well or receiver from whence it is elevated into the thrasher and is subsequently carried on to a straw walk comprising a series of longitudinal rocking plates between which vertically reciprocating elevators or walkers operate to distribute the straw and wheat and enable the grain to be separated from foreign matter. The fan is mounted on an extension of the frame rearward of the sieve instead of being placed in advance of same thus enabling additional elevators respectively for the incompletely thrashed heads and for the clean grain to be located side by side.

But in order that my invention may be better understood, I will now describe the same by aid of the accompanying illustrative drawings wherein:—

Fig. 1 is a side elevation of the improved header and thrasher harvester.

Fig. 2 is a plan of Fig. 1.

Fig. 3 is a rear view illustrating mechanism for reciprocating the knife bar.

Fig. 4 is sectional rear elevation of straw walk showing position of sieve box.

Fig. 5 is side view of disc for cleaning comb.

Fig. 6 is end view of thrashing drum.

In each of the illustrations similar figures of reference are used to denote similar parts in the various illustrations.

In the drawings 1 is the frame for the body of the machine and is supported by the traction wheels 2 and 3, the front portion of the machine being carried by a conveniently placed steering wheel 4 fitted with the customary handle 5 adjacent to the driver's seat 6 An out rigged portion of the frame is provided at 7 and assists in supporting a hinge bar 8 in an elevated position, a corresponding support being provided at 9 on the opposite side of the machine but in alignment with the bar 8 and is supported preferably by a bent stay or standard 10 or by any other suitable device appropriate to the machine to which my invention may be applied.

The bars 8 and 9 may be regarded as a fixed portion of the frame and to these bars the front part of the machine is hinged thus enabling the comb and its associated parts to be elevated or depressed to suit the height of the crop without rendering it necessary to alter other parts of the machine. It also renders the comb and its associated parts readily removable from the remainder of the machine to facilitate packing and transport.

The elements comprising the movable front portion of the machine consist of the comb 11 of any suitable device but preferably curved downwardly at its base. This comb is mounted upon an apron or platform 12 and beneath it a series of knives or cutters 13 (Fig. 2) operate with a reciprocating motion. The knives 13 are carried by a knife bar 14 which is mounted in suitable guides and operated (Fig. 3) in the following manner:—

A supplemental frame 15 is squarely attached to the apron or platform 12 by any convenient means and is furnished with sliding elements such as the slide bars 16 upon which the slide block or carriage 17 is supported. The slide block or carriage is furnished with anti-friction wheels or rollers 18 and is attached in any convenient manner to the knife bar previously mentioned, all necessary guides and the like for supporting and adjusting the bar being furnished. Reciprocal motion is transmitted to the block by means of a disc or wheel 19 which is mounted upon the shaft 20, but instead of being squarely fitted thereto it is set at an angle so that it rotates with reciprocating rotary movement thus conveying reciprocating horizontal movement to the slide block or carriage with which the knife bar is associated as will be well understood. The shaft 20 is rotated by a sprocket wheel 21 which receives its motion from the belt wheel 30 hereinafter referred to.

The comb is prevented from becoming choked by means of a sweeping or clearing device which consists of a sweeper shaft 22 mounted upon suitable bearings 23 arranged at each end of the platform. In its preferred form this shaft is of square section with rounded ends and upon which I mount a series of suitably spaced sweeper discs 24. These discs are mounted upon the square shaft at an angle or slope of about 30 degrees, the angle however may be varied to suit the width of the comb teeth or the distance apart of the various discs.

A convenient method of mounting the discs consists in the use of collars 25 which may be of cast metal and are cast or wrought so as to have an attachment face of the required angle to enable the sweeper discs to be fixed thereto by the aid of a stud bolt or a rivet. When rotary motion is imparted to the shaft the discs in their rotation produce a sweeping effect of a backward and forward nature above and adjacent to the spaces between the teeth of the comb.

Rearwardly of the sweeper shaft and in horizontal alignment therewith is mounted a conveyor shaft 26 which is supported at each end thereof in suitable bearings 27. Mounted upon this shaft 26 is a helical conveyor 28 for the purpose of conveying the wheat ears, which are being gathered by the comb, to an elevator 34. A short length of the conveyor designated 29 is disposed in a reverse direction from that of the other portion thereof so as to assist in heaping up the ears adjacent to the elevator. Motion is imparted to the conveyor shaft of the belt wheel 30 which also conveys motion to the sprocket wheel 21. The belt wheel 31 on the opposite end of the conveyor shaft transmits motion to the belt wheel 32 on the corresponding end of the sweeper shaft previously mentioned.

Rearward of the platform I provide an upwardly curved extension or fender 33 to prevent gathered crop from being thrown off of the platform.

Opposite to the reverse portion of the helical structure I supply an elevator 34 for lifting the gathered crop towards the top of a thrashing device. This elevator may consist of the usual type provided with cross battens mounted upon suitable sprocket rollers 35 but it is of importance that the shaft or spindle 36 of the upper sprocket should be in true central and horizontal alignment with the hinge bar 8 previously described. The shaft or spindle last referred to receives its motion from the belt wheel 37 at one end and a corresponding wheel 38 at the opposite end transmits motion to a wheel 30 and parts associated therewith. In all of the transmission gear thus far mentioned in the foregoing specification toothed gearing has been avoided and chain belts are used for conveying the motion from wheel to wheel. As far as possible and except for primary driving movements the use of toothed gearing has been avoided but sprocket wheels and chains should be used in lieu of belt wheels and belts if so desired.

The platform with its associated parts is radially supported by the arms with such supplemental arms as may be necessary or desirable having regard to the length and weight of the platform, but an important feature of the invention consists in the arrangement of the radial axis which passes through the spindle of the upper roll of the conveyor. This enables the front portion of the machine with its associated parts to be elevated or depressed as previously indicated. The mechanical device used for achieving the elevation or depression of the forward parts of the machine is subject to modification but preferably consists of the parts shown in the illustrations which may be described as follows:

Upon the frame of the machine and adjacent to the driver's seat I mount the winding shaft 40 in suitable bearings and provide it with a compensating coil spring 41 to assist in raising the parts after they have been lowered. Upon this shaft I mount a toothed wheel 42 and also a winding handle 43 with a ratchet lock or other holding device, the constructional details being of little importance. Upon the inner end of the winding shaft I mount a lever arm 44 which is hinged to the arm 45 directly connected with the swinging lever 46 the upper end of which is hinged in alignment with the elevator spindle as clearly indicated in the drawings, and from this swinging lever an arm 86 extends to the platform 12 and is firmly secured thereto. By means of this device the platform and its associated parts can be elevated or depressed to suit the height of the crop to which the machine is applied.

I will now describe the arrangement of the primary power mechanism which however does not vary very much from the devices already in use with reaping and harvesting machines. Upon the main traction wheel 3 I mount a crown wheel 47 which acting through the pinion 48 conveys motion to the wheel 49 by which rotary motion is imparted to the wheel 50 either by sprocket or other device. Upon the inner end of the shaft 51 I mount the toothed wheel 52 which conveys motion to the pinion wheel 53 which is mounted upon the axle 54 of the thrasher drum 55, spring governed hinged doors 57 and 58 (Fig. 1) being provided for inspection purposes and to close the openings between the elevator and the interior of the drum chamber, when the comb is raised or lowered.

In the construction of the thrasher drum I prefer to use a frame having radiating arms 59 which carry cross bars 60 upon which a roughened surface is formed preferably by the use of cast metal bars upon which knobs of round, square or diamond shape formation are cast as indicated at 61 in Fig. 6, correspondingly corrugated bars being arranged at 62 underneath the drum. These elements do not form a specific part of my invention. Rearward of the thrasher drum I arrange a frame 63 within which I enclose a straw walk of novel design. This straw walk consists of a series of plates 64 which are preferably slightly curved and lie almost in a horizontal position but have a slight upward tendency towards the rearward end. These plates are perforated as shown in Fig. 2 and may be slightly flanged over as indicated at 65 in Fig. 1 the better to serve as guides for the vertically arranged intermediate plates 66.

The horizontal plates are supported at the forward end upon a rocker 67 their rearward ends being carried by a cranked rocking bar 68 which receives reciprocating motion from a short connecting rod 69 one end of which is attached to a crank or pin 70 mounted upon the rocking wheel 71 which derives its motion preferably from a belt wheel 72 on the thrasher drum spindle and passes such motion on to a multiple crank shaft 73. The vertical bars of the straw walk are supported on their forward ends by the aid of a cross bar 74 upon which loose rockers 75 are mounted at varying angles arranged in sequence so that the movement of the bars which they control correspondingly takes place in sequence, that is to say the bars rise and fall one after the other.

The rearward ends of the rocking bars are mounted upon the cranks of the multiple crank shaft 73 previously referred to, the centre of each crank being placed in vertical alignment with the space between the adjacent rocking bars.

Beneath the straw walk I provide a guide hopper 76 of simple construction to assist in carrying the grain into the sieve box 77 which is of ordinary construction and may be supported on the rockers 78. The fan drum is shown at 79 and is operated through the belt wheel system 80, 81 and 82. The elevator casing for the grain is omitted from Fig. 1 but is shown at 83 in Fig. 2, a discharge chute being provided at 84, a portion of the return chute being shown at 85 but these do not differ materially from corresponding appliances used in other machines for a similar purpose, except that they are placed in a direct line to simplify the driving mechanism.

The operation of the various parts of my invention may be briefly stated as follows:

By means of the gearing arranged in conjunction with the shaft 40 and the various levers associated therewith the comb and its associated parts including the elevator can be raised or depressed to suit the height of the crop which it is desired to reap, and the whole of these parts can be easily and quickly detached from the body portion of the machine for packing and transport purposes, disconnection being made between one or other of the levers connected with the shaft 40 and the supports from the main frame so as to free the hinge bar 8 and its corresponding member 9 and also by freeing the spindle 26 of the conveyor.

The knife bar is operated with reciprocal motion transmitted from the angularly mounted disc 19 through the intermediate mechanism which is supported upon the slide bar 16. The combs are kept clear by the sweeping motion of the notched discs 24 by their oscillating movement backwards and forwards thus obtained by the peculiar method of mounting them upon the sweeper shaft, and the ears of wheat or other crop thus liberated is carried along the apron by means of the conveyor and carried to the thrasher by the elevator and from thence to the straw walk. The straw thus carried over from the elevator falls on to the straw walk from whence it is ejected at the rear of the machine, the grain and other heavy particles, however, being offered an opportunity of finding their way on to the rocking sieve which is placed beneath the straw walk.

There are, of course, various details of construction which need not be detailed in the present specification as they are used in ordinary practice, for instance any convenient device may be used for the attachment of the supporting elements of the front part of the machine to the hinge bars 8 and 9 of the frame or body.

Having now fully described and ascertained my said invention, and the manner in which it is to be performed, I declare that what I claim is—

1. In an improved header and thrasher harvester, the combination with means for operating a knife bar comprising a rotating shaft, a single disc mounted on the shaft and angularly disposed with respect to its axis of rotation, a carriage embracing said disc and reciprocated thereby, a knife bar connected to said carriage, of an elevator operatively connected with said shaft and comprising a comb and apron, a hinge bar having stays and levers to support the comb and apron, and an upper drum spindle mounted in alignment with the said hinge bar and being operatively connected with the latter to enable radial elevation or depression of the apron.

2. In an improved header and thrasher harvester, the combination with means for operating a knife bar comprising a rotating shaft, a single disc mounted on the shaft and angularly disposed with respect to its axis of rotation, a carriage embracing said disc and reciprocated thereby, a knife bar connected to said carriage of a rotating sweeper shaft, a series of sweeper discs angularly mounted on the latter shaft, means for supporting and maintaining said discs in angular position with respect to the axis of the shaft, means for rotating the sweeper shaft, and a comb associated with the knife bar, said sweeper discs having engaging surfaces and being disposed to operate adjacent to the base of the said comb to clear the same of gathered crop material.

3. In an improved header and thrasher harvester, the combination with means for operating a knife bar, comprising a rotating shaft, an angle disc mounted on the shaft and angularly disposed with respect to its axis of rotation, a carriage embracing said disc and reciprocated thereby, a knife bar connected to said carriage, of an elevator comprising an upper shaft, an elevator drum therefor, and elevated hinge bars supported on said harvester and having their axes in true central alignment with said upper shaft and elevator drum.

4. In an improved header and thrasher harvester the combination with means for operating a knife bar, comprising a rotating shaft, a single disc mounted on the shaft and angularly disposed with respect to its axis of rotation, a carriage embracing said disc and reciprocated thereby, a knife bar connected to said carriage, of a series of comb teeth, a sweeper bar, sweeper discs therefor, a helical conveyor and elevator, an upper elevator drum having a spindle thereon, said parts being detachable and radially supported upon a hinge bar aligned with the spindle of the upper elevator drum.

In testimony whereof he hath affixed his signature in presence of two witnesses.

HARRY JOSEPH McQUILLAN.

Witnesses:
JOHN HUBERT COOKE,
PHILLIS INA MAY BACH.